US011625650B2

(12) United States Patent
Gonzalez et al.

(10) Patent No.: US 11,625,650 B2
(45) Date of Patent: *Apr. 11, 2023

(54) INTELLIGENT TRAVEL PLANNING

(71) Applicant: INTERNATIONAL BUSINESS MACHINES CORPORATION, Armonk, NY (US)

(72) Inventors: Jason A. Gonzalez, Lewisville, TX (US); Stephanie Bianchi Mccaffrey, Farmers Branch, TX (US); Tassanee Kraipon Supakkul, Euless, TX (US); Abby Nicole Tisdale, Grapevine, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 443 days.

This patent is subject to a terminal disclaimer.

(21) Appl. No.: 16/398,489

(22) Filed: Apr. 30, 2019

(65) Prior Publication Data

US 2019/0258967 A1 Aug. 22, 2019

Related U.S. Application Data

(63) Continuation of application No. 15/239,397, filed on Aug. 17, 2016, now Pat. No. 10,332,039.

(51) Int. Cl.
*G06Q 10/02* (2012.01)
*G06Q 30/02* (2023.01)
*G06Q 50/14* (2012.01)

(52) U.S. Cl.
CPC ........... *G06Q 10/02* (2013.01); *G06Q 10/025* (2013.01); *G06Q 30/02* (2013.01); *G06Q 50/14* (2013.01)

(58) Field of Classification Search
CPC .. G06Q 10/00–30; G06Q 10/02; G06Q 50/30; G06Q 50/14; G06Q 30/02; G06Q 10/025
See application file for complete search history.

(56) References Cited

U.S. PATENT DOCUMENTS 5,021,953 A 6/1991 Webber et al.
7,769,611 B1 8/2010 Rodriguez et al.
(Continued)

OTHER PUBLICATIONS

ProjectLounge.com, inc. launches new website; streamlines access to self-service online collaboration based on IBM software. (Nov. 29, 2004). Business Wire Retrieved from https://dialog.proquest.com/professional/docview/445536005?accountid=131444 (Year: 2004).*

(Continued)

*Primary Examiner* — Resha Desai
*Assistant Examiner* — Michelle E Carey
(74) *Attorney, Agent, or Firm* — Aaron Pontikos; George S. Blasiak; Heslin Rothenberg Farley Mesiti P.C.

(57) ABSTRACT

A method includes: a travel planning system, via a user interface, receives requirements for a trip from a user; collects preference information of the user for the trip; searches available travel options based on the requirements and the preference information; builds an itinerary based on the searched travel options by use of a balance combination of relative weights for sources of the preference information; applies external data relevant to the itinerary; obtains a response to the itinerary from the user; either adjusts the itinerary or makes reservations respective to the travel options in the itinerary, depending on types of a response from the user; records at least one change to the itinerary via the user interface in a user device while the user device is off-line; and responsive to the user device getting online, synchronizes the at least one change to the itinerary stored in the travel planning system.

20 Claims, 7 Drawing Sheets

(56) References Cited

U.S. PATENT DOCUMENTS

| | | |
|---|---|---|
| 8,374,895 B2 | 2/2013 | Crean et al. |
| 9,117,182 B2 | 8/2015 | Bapna et al. |
| 10,055,466 B2 | 8/2018 | Trudel et al. |
| 10,332,039 B2* | 6/2019 | Gonzalez ............... G06Q 50/14 |
| 2002/0013836 A1 | 1/2002 | Friedman et al. |
| 2002/0045959 A1 | 4/2002 | Van Overveld |
| 2002/0169651 A1 | 11/2002 | Limousin et al. |
| 2003/0018549 A1 | 1/2003 | Fei et al. |
| 2003/0023463 A1* | 1/2003 | Dombroski ............ G06Q 10/02 705/5 |
| 2004/0002932 A1 | 1/2004 | Horvitz et al. |
| 2005/0033616 A1* | 2/2005 | Vavul .................... G06Q 10/02 705/5 |
| 2005/0096946 A1 | 5/2005 | Janakiraman et al. |
| 2005/0177446 A1 | 8/2005 | Hoblit |
| 2006/0020614 A1 | 1/2006 | Kolawa et al. |
| 2007/0073562 A1* | 3/2007 | Brice .................... G06Q 10/02 705/5 |
| 2007/0078729 A1 | 4/2007 | Brown |
| 2007/0150320 A1 | 6/2007 | Huang |
| 2008/0046298 A1* | 2/2008 | Ben-Yehuda ........ G06Q 10/109 705/6 |
| 2008/0114807 A1 | 5/2008 | Sembower |
| 2008/0243564 A1* | 10/2008 | Busch .................... G06Q 10/02 705/6 |
| 2009/0193107 A1* | 7/2009 | Srinivasan .............. H04L 67/28 709/223 |
| 2009/0210262 A1 | 8/2009 | Rines et al. |
| 2010/0030594 A1 | 2/2010 | Swart |
| 2010/0063854 A1* | 3/2010 | Purvis .................... G06Q 10/02 705/5 |
| 2011/0055043 A1 | 3/2011 | Shuchman et al. |
| 2012/0209842 A1* | 8/2012 | Bettridge ........... G06Q 30/0631 707/736 |
| 2012/0215797 A1 | 8/2012 | Fabris et al. |
| 2012/0330698 A2* | 12/2012 | Gilliam ............... G06Q 10/025 705/6 |
| 2014/0052714 A1 | 2/2014 | Brodziak et al. |
| 2014/0095216 A1 | 4/2014 | Radhakrishnan |
| 2014/0114705 A1* | 4/2014 | Bashvitz .............. G06Q 10/047 705/5 |
| 2014/0129372 A1* | 5/2014 | Kalnsay ............. G06Q 30/0631 705/26.7 |
| 2014/0149157 A1* | 5/2014 | Shaam ............... G06Q 30/0627 705/6 |
| 2014/0266805 A1 | 9/2014 | Tippelhofer et al. |
| 2015/0073868 A1 | 3/2015 | Garman |
| 2015/0142482 A1* | 5/2015 | Canis .................... G06Q 10/02 705/5 |
| 2015/0142610 A1 | 5/2015 | Manoharan et al. |
| 2015/0154512 A1 | 6/2015 | Wenger |
| 2015/0242927 A1* | 8/2015 | Will .................... G06Q 30/0629 705/26.64 |
| 2015/0253144 A1* | 9/2015 | Rau .................... G01C 21/3484 705/348 |
| 2015/0346718 A1 | 12/2015 | Stenneth |
| 2015/0369617 A1* | 12/2015 | Ding .................. G01C 21/3415 701/428 |
| 2016/0307281 A1 | 10/2016 | Canis et al. |
| 2017/0053209 A1* | 2/2017 | Ceret .................... G01C 21/343 |
| 2017/0083962 A1 | 3/2017 | Agarwal et al. |
| 2017/0154353 A1 | 6/2017 | Ralston |
| 2018/0053121 A1 | 2/2018 | Gonzalez et al. |
| 2018/0107950 A1 | 4/2018 | Gonzalez et al. |
| 2018/0181919 A1 | 6/2018 | Jobling et al. |

OTHER PUBLICATIONS

List of IBM Patent and/or Patent Applications treated as related for U.S. Appl. No. 16/398,489, filed Apr. 30, 2019, dated Aug. 5, 2019.
Non-Final Rejection, U.S. Appl. No. 15/239,397, filed Aug. 17, 2019, dated Oct. 16, 2018.
Applicant's Response to Non-Final Rejection, U.S. Appl. No. 15/239,397, filed Aug. 17, 2019 dated Oct. 30, 2018.
Notice of Allowance, U.S. Appl. No. 15/239,397, filed Aug. 17, 2019, dated Feb. 7, 2019.
Issue Fee Payment, U.S. Appl. No. 15/239,397, filed Aug. 17, 2019, dated May 5, 2019.

* cited by examiner

INTELLIGENT TRAVEL PLANNING

CROSS-REFERENCE TO RELATED APPLICATION

This application is a continuation of U.S. application Ser. No. 15/239,397, filed Aug. 17, 2016, titled "Intelligent Travel Planning", which is incorporated by reference herein in its entirety.

TECHNICAL FIELD

The present disclosure relates to automating travel planning, and more particularly to methods, computer program products, and systems for generating a personalized and well-informed itinerary and providing follow-up services during a trip according to the generated itinerary.

BACKGROUND

Conventional travel planning services are often provided by human travel agents or multiple searches on many travel service websites by travelers. Planning itineraries and scheduling activities avoiding conflicts are up to the travelers and/or the travel agents. Most of the time, each activity, accommodation, transportation, should be individually reserved at their respective websites. Once set, the itineraries are mostly inflexible or expensive to make any changes even before the travel. Also, during the travel, local weather, traffic, availabilities of activities and locations, may temporarily change but the travelers are usually unable to react to such changes.

SUMMARY

The shortcomings of the prior art are overcome, and additional advantages are provided, through the provision, in one aspect, of a method. The method for automated travel planning includes, for example: receiving, by at least one processor, requirements for a trip from a user using a user interface; collecting, by the at least one processor, preference information of the user for the trip; searching, by the at least one processor, available travel options based on the requirements and the preference information; building, by the at least one processor, an itinerary based on the travel options from the searching by use of a balance combination of relative weights for sources of the preference information; applying, by the at least one processor, external data relevant to the itinerary; obtaining, by the at least one processor, a response to the itinerary from the user; and making, by the at least one processor, reservations respective to the travel options in the itinerary, responsive to receiving a purchase confirmation of the itinerary from the user.

Additional features are realized through the techniques set forth herein. Other embodiments and aspects, including but not limited to computer program product and system, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
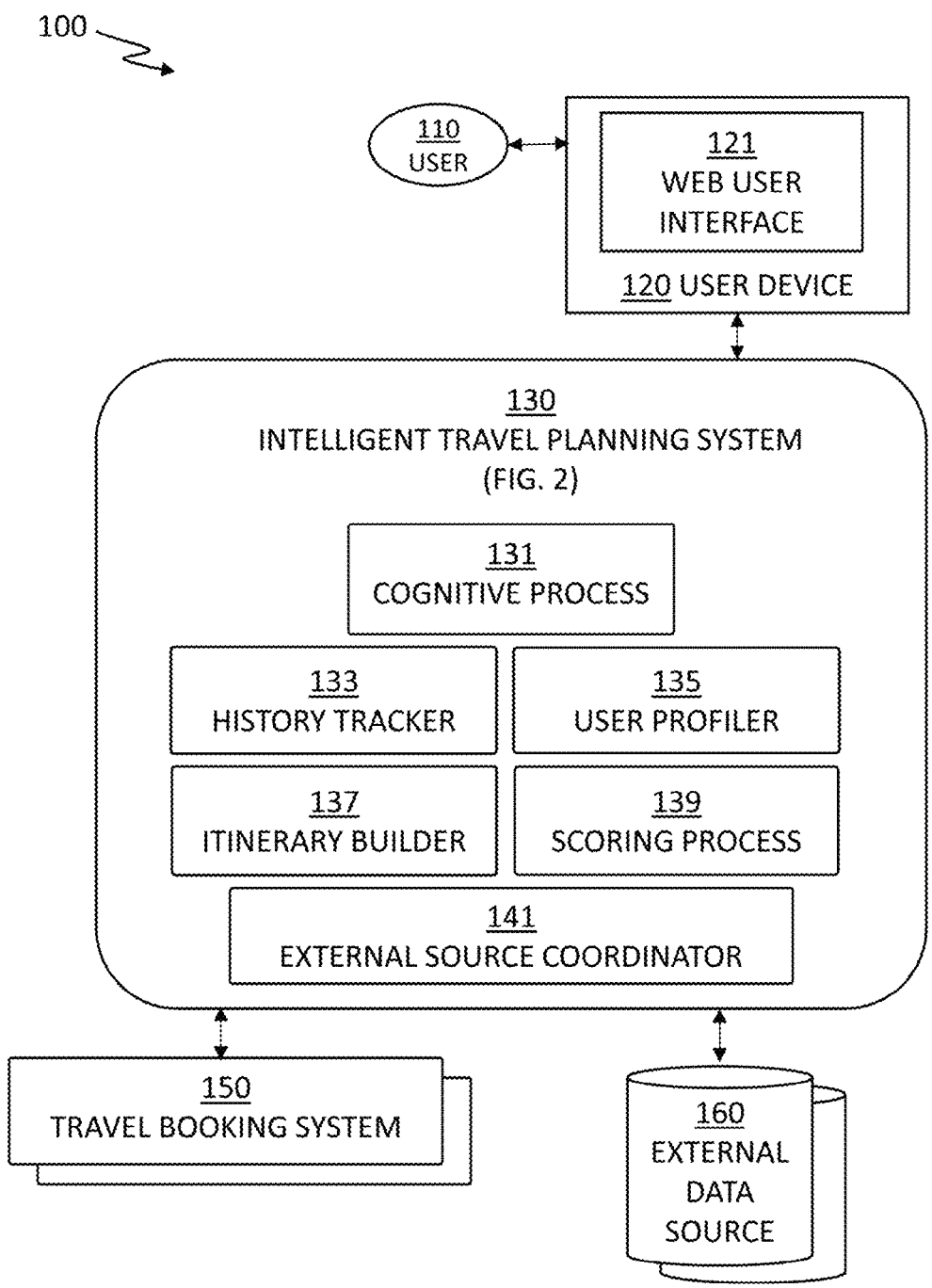
FIG. 1 depicts an intelligent travel planning system in a network environment, in accordance with one or more embodiments set forth herein.

FIG. 1 depicts an intelligent travel planning system 130 in a network environment 100, in accordance with one or more embodiments set forth herein.

The network environment 100 includes a user 110, a user device 120, the intelligent travel planning system 130, at least one travel booking system 150, and at least one external data source 160.

The user device 120 runs a web user interface 121, a software application program that facilitates access to the intelligent travel planning system 130 for the user 110, who may be an unregistered guest or a registered user. An example of the user device 120 may be, but not limited to, a smartphone having global positioning system (GPS) capability and access to the Internet at various locations of the user 110.

Embodiments of the present invention recognize that, although the number of both travelers, including the user 110, and travel options has grown dramatically and is predicted to grow even more and faster, travel planning is often done manually by individual travelers or their agents. Consequently, travel planning is often a tedious job of looking into numerous pieces of information and booking respective travel items from individual travel service providers, and coordinating things to make an itinerary. However, travelers have limited access to available travel options, have difficulty coordinating numerous travel options, and often miss out on the best options because they do not look for certain travel options and because they do not know the whole range of available travel options to choose from.

The intelligent travel planning system 130 includes a cognitive process 131, a history tracker 133, a user profiler 135, an itinerary builder 137, a scoring process 139, and an external source coordinator 141. The intelligent travel planning system 130 may further include a billing system, a security process, a marketing and e-commerce process, a travel manager for following up a trip and for sending reminders to the user 110, for altering real time information to the user 110 during the trip, and for locating the user 110 and for providing additional travel information for current location of the user 110. In one embodiment of the present invention, the intelligent travel planning system 130 operates in a cloud computing environment 50 of FIG. 6, and the components 131, 133, 135, 137, 139, and 141 of the intelligent travel planning system 130 may be distributed across participating computing nodes 10, of FIGS. 5 and 6, of the cloud computing environment 50 of FIG. 6.

The cognitive process 131 of the intelligent travel planning system 130 interacts with the user 110 via the web user interface 121 to take travel requirement inputs and feedback responses from the user 110. The cognitive process 131 includes natural language processing and machine learning functionalities, and is trained in travel jargon such that the intelligent travel planning system 130 may communicate with the user 110 in a natural language to plan a trip and may learn personal preferences of the user 110 as the interaction between the cognitive process 131 and the user 110 progresses. As the cognitive process 131 parses inputs from the user 110 into a specific request for other components of the intelligent travel planning system 130 and/or for components external to the intelligent travel planning system 130, processes corresponding to the specific request are invoked to complete the specific request, and to generate a result responsive to the inputs for the user 110. The cognitive process 131 may ask for clarification of the inputs from the user 110, or may make inferences regarding the nature of the inputs based on a user profile associated with the user 110, by use of the user profiler 135, or otherwise relevant data as adapted from past responses and other data sources by a large number of users, such that the intelligent travel planning system 130 may have more accurate information as to the intent of the user 110 represented by the inputs, and consequently, the intelligent travel planning system 130 may generate the result that suits the intent of the user 110 better than automatically generated search results based on inputs of simple queries as provided by conventional travel booking systems.

The history tracker 133 of the intelligent travel planning system 130 records data on usage of the intelligent travel planning system 130 by all users, both guests and registered users. The history tracker 133 runs predictive models on the recorded usage data, including interactions between the users and the intelligent travel planning system 130 during a planning session as well as purchases, such that the intelligent travel planning system 130 may anticipate and refine future interactions with and better serve the users.

By use of the history tracker 133, the intelligent travel planning system 130 may interact with respective users in a manner individually customized based on the usage data without a significant amount of preference data that are conventionally requested for the users to manually input. The usage data recorded by the history tracker 133 is made available for the user profiler 135 to build a user profile for later use as authorized by the user 110. For example, if the user 110, in the past, had repeatedly selected travel seasons which are characterized as more expensive but more likely to have pleasant weather, the intelligent travel planning system 130 associates a higher priority for weather than a priority for price, and adjust weights for respective aspects accordingly in the process of scoring a candidate itinerary by use of the scoring process 139. For another example, in a case that an unregistered guest requests information on a particular destination, the intelligent travel planning system 130 may utilize usage data from other users who made a trip to the destination such that the intelligent travel planning system 130 may predict what kind of information would be of interest to the unregistered guest more accurately and make recommendations as to activities, accommodations, local and nearby attractions, restaurants, etc. For still another example, the history tracker 133 may build large-scale purchase history data for a group of users having similar purchase histories such that the intelligent travel planning system 130 may recommend similar travel options for the group of users sharing similar purchase histories rather than for the general user population. The purchase histories of the intelligent travel planning system 130 may include travel destinations, travel reviews/evaluations, duration of travels, etc., that may or may not be what the user had preferred at the time of planning. The intelligent travel planning system 130 may add travel evaluations by users to respective user profiles.

The user profiler 135 of the intelligent travel planning system 130 creates and stores user profiles respective to individual registered users, upon being explicitly agreed to by the users, based on the usage data corresponding to the registered users. The user profiler 135 also records characteristics and preferences of registered users in respective user profiles, as identified by the cognitive process 131 during interactions with the registered users. The user profile may further include membership numbers for various travel programs and travel preferences as input by the user 110. By use of the user profiles, the intelligent travel planning system 130 may provide personalized travel planning services for the registered users, in contrast to conventional travel booking systems making the same recommendations to all based on general assumptions on traveler preferences.

The itinerary builder 137 of the intelligent travel planning system 130 generates an itinerary by use of respective results from one or more travel booking systems 150 that provide conventional reservation services. The itinerary builder 137 may further interact with the external source coordinator 141 to apply external data that is not originating from the travel booking systems 150 but otherwise relevant to the itinerary such that the itinerary would more accurately reflect trip requirements of the user 110 than without the external data. Examples of the external data may be weather information for a travel destination, social media sentiments such as likes and dislikes, and review comments on activities, hotels, and/or attractions on the itinerary.

The itinerary builder 137 incorporates personal preference information of the user 110 with reservation results from the travel booking systems 150 by use of the scoring process 139 in order to generate a customized itinerary based on the personal preference information of the user 110. In one embodiment of the present invention, the itinerary builder 137 may utilize a catalog database, which includes numerous travel options, including hotel packages and tour programs with descriptions, schedules, availability, as well as itinerary templates. The catalog database may be external to the intelligent travel planning system 130 and may be accessed by use of the external source coordinator 141, or directly by the itinerary builder 137.

The personal preference information of the user 110 may have been gathered by the cognitive process 131 during a live session with the user 110, made available from the history tracker 133 and/or the user profiler 135. The scoring process 139 weighs relative significance of respective sources of the personal preferences information based on predetermined configuration. The description of the scoring process 139 is detailed below.

The scoring process 139 of the intelligent travel planning system 130 weighs sources of the personal preference information of the user 110 to reduce the number of available travel selections by investigating only the high-scored options that are best suited for the personal preference of the user 110. The scoring process 139 provides criteria for the itinerary builder 137 to meet in searching individual booking results and in selecting the individual booking results for the itinerary, and consequently, alleviates some computing workloads of the cognitive process 131 in maintaining the real time interaction with users by optimizing the itinerary within less number of interactions.

In one embodiment of the present invention, the scoring process 139 relatively scores data sources of the personal preference information including real time interactions, a purchase history, and a user profile, corresponding to a registered user. The real time interactions are kept by the cognitive process 131, the purchase history by the history tracker 133, and the user profile by the user profiler 135. By use of the real time interactions, the scoring process 139 may weigh latest interests of the user and specific purposes of a current trip more than general priorities and personal preferences of the user. By use of the purchase history, the scoring process 139 may weigh in past travel tendencies of the user more than other sources of preference information. Also, by use of a large scale purchase history of a group of users, the scoring process 139 may weigh in general tendency of travelers for a certain destination. By use of the user profile, the scoring process 139 may weigh in personal preferences with regard to aspects not appearing in the purchase history such as how much the user prefers a certain departure location to be near the residence of the user.

The external source coordinator 141 of the intelligent travel planning system 130 maps and transfers information from the external data sources 160 in real time. In order to reduce the number of accesses to the external data sources and associated fees, a certain amount of frequently used external data may be cached within the intelligent travel planning system 130. Keeping the cached external data synchronized with originals of the external data sources 160 for the latest information at all times, particularly when time-critical reservation data is rapidly changing in real time, may not be efficient for the operations of the intelligent travel planning system 130, and consequently the external source coordinator 141 is employed to assure that the external data utilized by the components 131, 133, 135, 137, and 139 of the intelligent travel planning system 130 is the latest and that the external data sources 160 are most efficiently accessed. By use of the external source coordinator 141, the intelligent travel planning system 130 interacts with the external data source 160 in an abstract level without exposing all functional components of the intelligent travel planning system 130 that require external data. In one embodiment of the present invention, the intelligent travel planning system 130 may still function in a restricted manner without the external source coordinator 141 by use of cached external data, which may be later synchronized with the external data sources 160.

Examples of data serviced by the external source coordinator 141 may be weather updates and social media data, which may be utilized by the cognitive process 131 to generate travel recommendation to avoid certain locations for inclement weather, to refrain from certain areas or activities relevant to safety of the user, etc. Further, the same examples of the external data, including weather information for a travel destination, social media sentiments such as likes and dislikes, and review comments on activities, hotels, and/or attractions on the itinerary, may be utilized by the itinerary builder 137 in creating the itinerary.

The intelligent travel planning system 130 is coupled to at least one travel booking system 150, and at least one external data source 160. The travel booking systems 150 may include conventional travel booking systems such that travel items of activities, transportation, accommodation, etc., which are included in the itinerary as created by the intelligent travel planning system 130 may be reserved by use of the travel booking systems 150 directly from the intelligent travel planning system 130. The intelligent travel planning system 130 may be coupled to various external membership and loyalty programs with which the users may have signed up, such that the intelligent travel planning system 130 may prioritize reservations for certain users in external membership/loyalty programs to use the offers from the external membership/loyalty programs as well as to synchronize records for the user to earn or to use points for the respective external membership/loyalty programs.

The intelligent travel planning system 130 further provides follow-up services after the itinerary was produced such as off-line updates, real time notification during the trip, travel logging, etc. The off-line updates facilitate the user to make changes to the itinerary off-line, which will be stored in the user device 120 and later synchronized with the intelligent travel planning system 130 once the user device 120 becomes on-line. The intelligent travel planning system 130 examines off-line updates to the itinerary and adjusts the itinerary by making proper corrections to the reservations included in the itinerary, makes new recommendations for the user by informing the user when the off-line updates conflict with the rest of the itinerary or are otherwise unavailable. The real time notification is to better inform the user about local weather, news, social media feeds, etc., in real time such that the user may travel with the least disruption. For example, the intelligent travel planning system 130 may monitor local weather data closely for any outdoor activities scheduled for the user and, if a bad weather is forecasted in the outdoor activity destination, makes a recommendation to adjust the schedule to avoid the weather, to switch with an indoor activity scheduled for dates with good weather. The travel logging function maps location of the user in relation to the itinerary to better record visited destinations and to make recommendations as to what kind of adjustments may be made during the trip.

In certain embodiments of the present invention, the intelligent travel planning system 130 provides recommendations such as a different departure location for a flight, reordering trip destinations, or rescheduling a trip to another season due to various reasons of personal preferences of the user. Examples of reasons of such recommendations may be, but are not limited to, price advantage of another option, anticipated improvements in enjoyment and convenience of the user based on personal likes and dislikes found in social media, business hours of a point of interests, weather condition for outdoor activities, traffic conditions such as local road closure schedules, or the time of day when fewer tourists are around.

Figure 2:
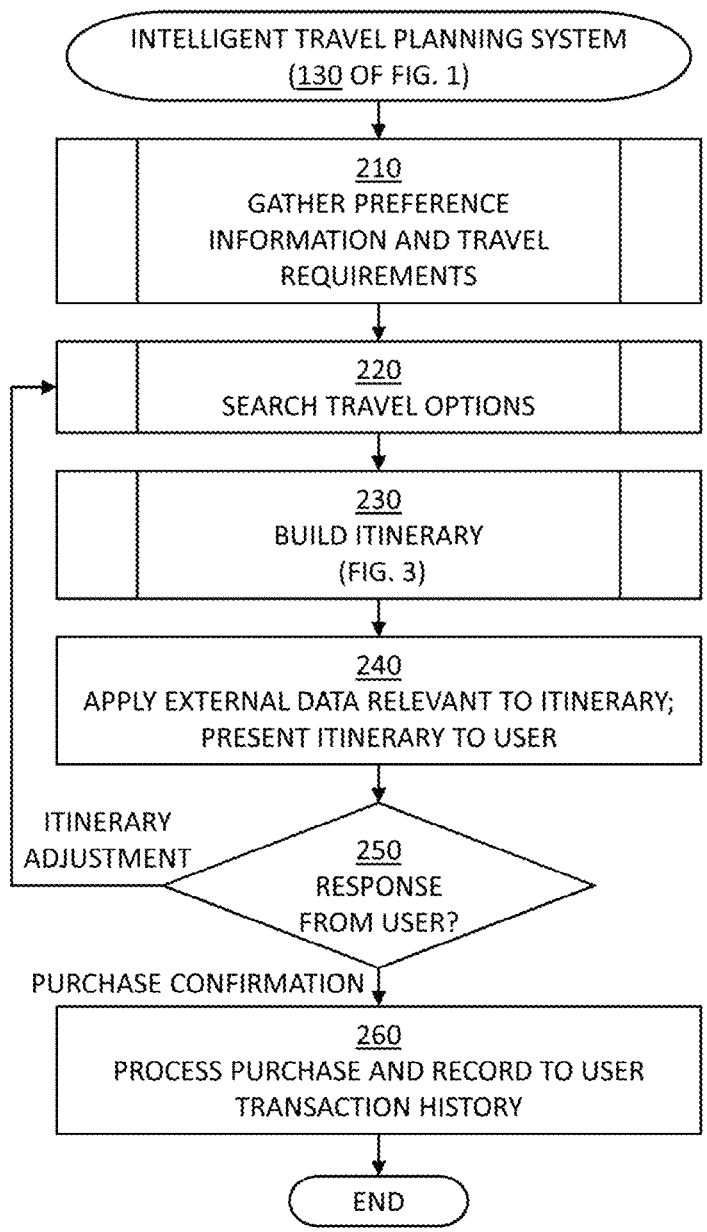
FIG. 2 depicts a top-level flowchart for the intelligent travel planning system, in accordance with one or more embodiments set forth herein.

FIG. 2 depicts a top-level flowchart for the intelligent travel planning system 130 of FIG. 1, in accordance with one or more embodiments set forth herein.

Blocks 210 through 260 indicate a travel planning session for a user, as performed by the intelligent travel planning system 130 by use of various functional components as described in FIG. 1.

In block 210, the intelligent travel planning system 130 gathers personal preference information of the user and travel requirements. As described above, the personal preference information may be a combination of a user profile, a purchase history, inputs and feedback to a proposed itinerary during a travel planning session. The travel requirements are collected via the cognitive process, based on various user inputs of speech, input text, etc. In one embodiment of the present invention, the user who has a corresponding user profile is treated as a registered user, and the user who does not is treated as an unregistered guest of the intelligent travel planning system 130 for scoring purposes in balancing sources of preference information. Non-limiting examples of travel requirements may be, destination, price, time of year, month, and day, etc. Non-limiting examples of preference information may be, demographic information of the user in the user profile, recorded preference of the user including likes, dislikes, preferred airlines/airports, preferred seat/mode/number of stops for a flight, preferred travel style such as average days spent in one destination, recorded past travel experience of the user, experience and itineraries of other travelers for the same destination as the destination of the user, evaluation/ratings/reviews of other travelers, etc. Then the intelligent travel planning system 130 proceeds with block 220.

In block 220, the intelligent travel planning system 130 searches travel options from the travel booking systems and other sources for the user such as membership/loyalty programs based on the preference information and the travel requirements gathered in block 210. In one embodiment of the present invention, the itinerary builder or the cognitive process of the intelligent travel planning system 130 performs searches for relevant travel options from available data, either internal or external, based on the preference information and the travel requirements as scored by a default balance combination of relative weights, in which a default preference is one hundred percent (100%), or by a current balance combination as adjusted in block 230 of a previous loop. See FIG. 3 and description for details of relative weights. Then the intelligent travel planning system 130 proceeds with block 230.

In block 230, the intelligent travel planning system 130 builds an itinerary by use of the itinerary builder based on search results from block 220. See FIG. 3 and description for details of scoring and itinerary building. The itinerary resulting from block 230 is a highest-scored travel option based on scoring as configured by one embodiment of the scoring process. Then the intelligent travel planning system 130 proceeds with block 240.

In block 240, the intelligent travel planning system 130 supplements the itinerary by applying external data such as severe weather warnings or social media postings that may be relevant to the itinerary, if any. The itinerary may need to be re-ordered or updated due to the external data. The intelligent travel planning system 130 subsequently presents the itinerary to the user for a feedback, as the external data being applied. Then the intelligent travel planning system 130 proceeds with block 250.

In block 250, the intelligent travel planning system 130 determines what kind of response is received from the user in response to the itinerary presented in block 240. If the intelligent travel planning system 130 determines that the user responded to make changes to the presented itinerary in the feedback, then the intelligent travel planning system 130 loops back to block 220 to perform another search based on the requirements and preferences suggested in the response. If the intelligent travel planning system 130 determines that the user submitted a purchase confirmation to book the trip according to the presented itinerary, then the intelligent travel planning system 130 proceeds with block 260.

In block 260, the intelligent travel planning system 130 processes a purchase of the itinerary by making reservations with the travel booking systems, and records the purchase to a purchase history for the user. Then the intelligent travel planning system 130 completes the travel planning session for the user. See FIG. 4 and description for an exemplary travel planning session and an exemplary itinerary.

By use of personal preference information, the intelligent travel planning system 130 may fine-tune itineraries for certain preferences with best possible options. For example, a user may plan to visit Paris for a day on a Tuesday during a trek through Europe, without knowing that the Louvre Museum is closed on Tuesdays. The intelligent travel planning system 130 checks personal preference of the user in block 210 as well as general preference of other travelers for Paris against a tentative itinerary, and informs the user about the Tuesday closure at the Louvre Museum and makes recommendation to adjust the tentative itinerary such that the user would not miss the opportunity to visit the Louvre Museum due to lack of information. For another example, the user may plan to depart from Dallas to Paris without knowing airfares from Chicago to Paris would be significantly less than airfares from Dallas to Paris. The intelligent travel planning system 130 may inform the user of the difference in airfares and recommend the user to look at alternative departure locations by investigating travel options from Chicago to Dallas and respective cost savings. For still another example, the user may plan to travel various regions in Europe or countries around the world with minimum cost. The intelligent travel planning system 130 investigates weather patterns of the regions/countries, flight routes, etc., compares costs for various options, and makes recommendations as to in which order the user should visit the regions/countries. For still another example, the user may plan to stay in a first location for a few nights and to make a day trip to a nearby location having a famous tourist destination. The intelligent travel planning system 130 investigates local transportation options from the first location to the nearby location, respective weather at both locations, operating hours of the tourist destination, road conditions, special events at both locations, etc., and makes recommendations to the user based on personal preference information. Also the intelligent travel planning system 130 updates personal preference information for the user with choices the user makes from the recommendations such that personal preference and selection pattern of the user may be established by simply using the intelligent travel planning system 130.

Figure 3:
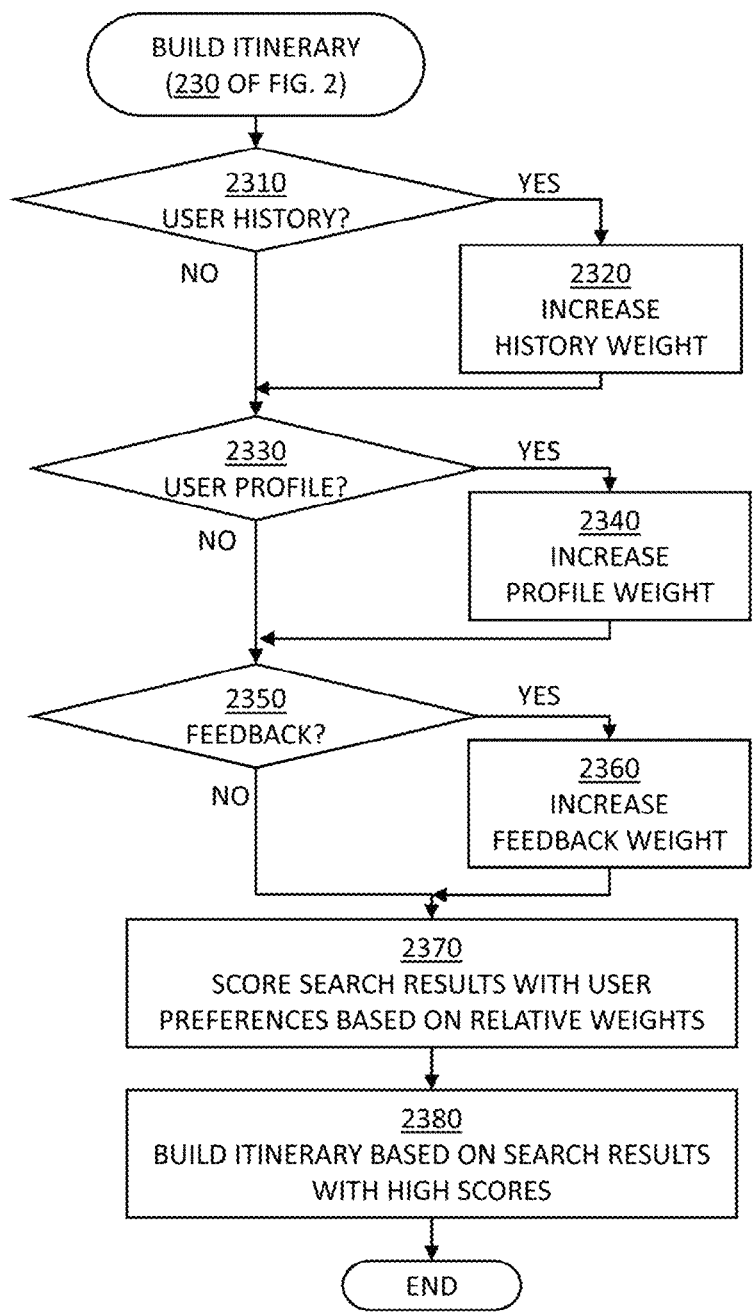
FIG. 3 depicts a flowchart of block 230 of FIG. 2 for building itinerary by use of the itinerary builder, in accordance with one or more embodiments set forth herein.

FIG. 3 depicts a flowchart of block 230 of FIG. 2 for building itinerary by use of the itinerary builder 137 of FIG. 1, in accordance with one or more embodiments set forth herein.

In block 2310, the intelligent travel planning system 130 determines whether or not the user has a purchase history, as stored by the history tracker from previous travel planning sessions. If the intelligent travel planning system 130 determines that the user has the purchase history, then the intelligent travel planning system 130 proceeds with block 2320. If the intelligent travel planning system 130 determines that the user does not have the purchase history, then the intelligent travel planning system 130 proceeds with block 2330.

In block 2320, the intelligent travel planning system 130 increases a relative weight for the purchase history by a predetermined percentile value. In one embodiment of the present invention, the intelligent travel planning system 130 employs a balance combination of four (4) kinds of relative weights to weigh in respective preference information into itineraries/recommendations for the user. In the same embodiment, the four relative weights in the balance combination may include a default preference, session data, a user profile, and a purchase history, as noted (F1, F2, F3, F4), wherein F1 is a percentile value for the default preference to be weighed in scoring, F2 is a percentile value for all interactions including inputs and feedbacks during a travel planning session to be weighed in scoring, F3 is a percentile value for the use profile to be weighed in scoring, and F4 is a percentile value for the purchase history to be weighed in scoring, and wherein F1+F2+F3+F4=1. The default preference is a general preference as employed in conventional travel booking systems, such as cost, departure and arrival schedules, duration including flight time and layovers, etc. The intelligent travel planning system 130 may adjust the default preferences based on a large scale historical data that had been established by a statistically meaningful number of users over time, to predict personal preferences better for a future user by using historical preferences by other travelers having similar travel requirements.

In the same embodiment, the default relative weight is one hundred percent (100%) for an unregistered guest who does not have either a history or a user profile. In the same embodiment, if the user made purchases, the relative weight for the history may increase in proportion to the number of purchases, in an increment of ten percent (10%) per purchase, according to a predetermined cap for the relative weight for the history, such as fifty percent (50%). For example, for a user who made one (1) purchase as stored in the purchase history, relative weights for scoring search results for the user may be (90%, 0%, 0%, 10%), if the user had not created a user profile when the user made the purchase. For another example, for a user who made five (5) or more purchases as stored in the purchase history, relative weights for scoring search results for the user may be (50%, 0%, 0%, 50%), if the user does not have a user profile. For the same user, if the user has the user profile, relative weights for scoring search results for the user may be further adjusted as shown in examples of block 2340 below. Then the intelligent travel planning system 130 proceeds with block 2330.

In block 2330, the intelligent travel planning system 130 determines whether or not the user has a user profile, as stored by the user profiler from previous travel planning sessions. If the intelligent travel planning system 130 determines that the user has the user profile, then the intelligent travel planning system 130 proceeds with block 2340. If the intelligent travel planning system 130 determines that the user does not have the user profile, then the intelligent travel planning system 130 proceeds with block 2350.

In block 2340, the intelligent travel planning system 130 increases a relative weight for the user profile by the predetermined percentile value. In the same embodiment as above, if the user who made five (5) or more purchases as stored in the purchase history also had created the user profile, relative weights for scoring search results for the user may be adjusted to (40%, 0%, 30%, 30%) from (50%, 0%, 0%, 50%) at the end of block 2320. Then the intelligent travel planning system 130 proceeds with block 2350.

In block 2350, the intelligent travel planning system 130 determines whether or not the user responds during a current travel planning session, in block 250 of FIG. 2, with a live feedback to adjust the itinerary. If the intelligent travel planning system 130 determines that the user provides the live feedback, then the intelligent travel planning system 130 proceeds with block 2360. If the intelligent travel planning system 130 determines that the user does not provide the live feedback, then the intelligent travel planning system 130 proceeds with block 2370.

In block 2360, the intelligent travel planning system 130 increases a relative weight for the feedbacks by the predetermined percentile value. In the same embodiment as above, if the user who made five (5) or more purchases and had created the user profile responds with the live feedback, the relative weights for scoring search results for the user may be adjusted to (40%, 20%, 20%, 20%) from (40%, 0%, 30%, 30%) at the end of block 2340. Then the intelligent travel planning system 130 proceeds with block 2370. For another user who is using the intelligent travel planning system 130 for the first time, the relative weights for scoring search results for the user may be adjusted to (90%, 10%, 0%, 0%) from (100%, 0%, 0%, 0%) that is a default for relative weights at the beginning of scoring for a new user without any record in the intelligent travel planning system 130. If the same first-time user keeps adjusting the itinerary in the same travel planning session by repeating blocks 220 through 250 more than a threshold number of times, then the relative weights for scoring search results for the user may become (50%, 50%, 0%, 0%), in an increment of ten percent (10%) per feedback, according to a predetermined cap for the relative weight for the feedback, such as fifty percent (50%). For a user who made one (1) purchase as stored in the purchase history, with no user profile, relative weights for scoring search results for the user after a first feedback may be (80%, 10%, 0%, 10%). For a user who made five (5) or more purchases as stored in the purchase history but had not created the user profile, relative weights for scoring search results for the user may be adjusted to (40%, 30%, 0%, 30%) after providing a threshold number of feedbacks. Then the intelligent travel planning system 130 proceeds with block 2370.

In block 2370, the intelligent travel planning system 130 scores respective search results from block 220 of FIG. 2, with the personal preference of the user as their relative weights balanced in blocks 2310 through 2360 above. Then the intelligent travel planning system 130 proceeds with block 2380.

In block 2380, the intelligent travel planning system 130 builds an itinerary by use of search results that had been scored higher than others in block 2370. Some high-scored options that are not included in the itinerary may still be passed to block 240 of FIG. 2 as recommendations to the user as alternatives or backup plans. Then the intelligent travel planning system 130 proceeds with block 240 of FIG. 2.

Figure 4:
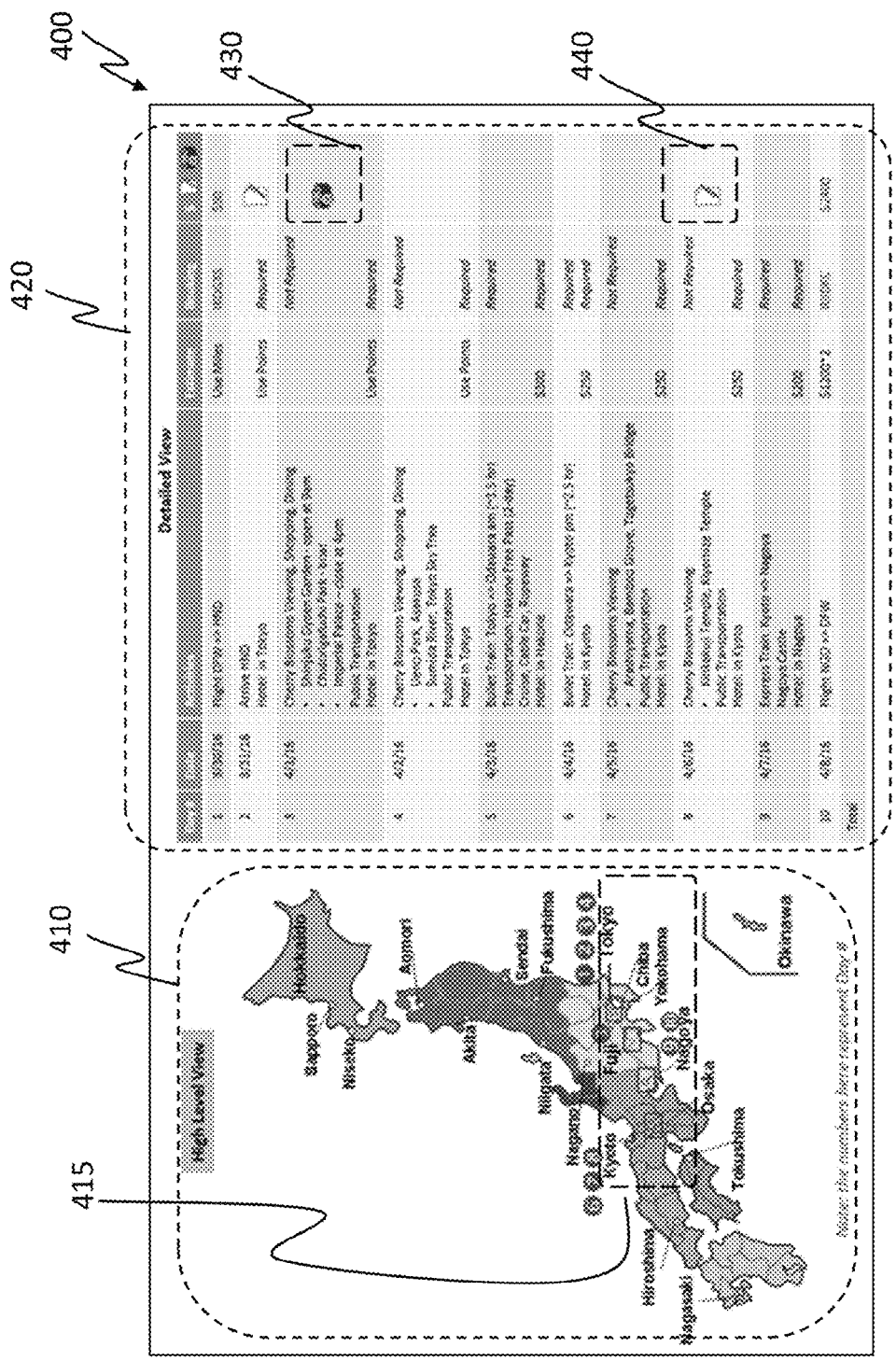
FIG. 4 depicts an exemplary itinerary as created by the intelligent travel planning system, in accordance with one or more embodiments set forth herein.

FIG. 4 depicts an exemplary itinerary 400 as created by the intelligent travel planning system 130 of FIG. 1, in accordance with one or more embodiments set forth herein.

The exemplary itinerary 400 includes a high-level view map 410 and a detailed view table 420. Initially, the intelligent travel planning system 130 may display directions for voice input "Tell me about your travel" or a microphone icon, a text box, selectable images of popular tourist destinations at the season, activities, preference of the user 110, etc., on a screen of the user device 120, when the user 110 opens the web user interface 121. In this embodiment of the present invention, the user device 120 is a smartphone and the web user interface 121 is a smartphone app. The cognitive process 131 of the intelligent travel planning system 130 mainly interacts with the user 110 via the web user interface 121, which will be represented as the intelligent travel planning system 130 for brevity.

The user 110 speaks, "I want to take my 50 years old sister to Japan for a week to see Cherry blossom. Can you please help me plan?" The user 110 also may type in the text box, select one of the images, to begin a travel planning session. As the user 110 is interested in a seasonal travel option, the intelligent travel planning system 130, responds with a period during which the seasonal travel option is available, "Certainly! Cherry blossom in Japan usually blooms from February to May depending on regions." The intelligent travel planning system 130 continues by asking, "Do you have a date range and/or places in mind?" In the same embodiment, the user 110 and the intelligent travel planning system 130 may communicate via a chat box with text display, via voice, via user input on the screen by selecting various selectable items, and combinations thereof. Also while responding to the user 110, the intelligent travel planning system 130 refreshes the screen display with images of Cherry blossom, and relevant information such as regional peak season map, etc., to further provide relevant information to the user 110.

The user 110 responds by, "How about end of March, early April?", and, the intelligent travel planning system 130 selects cities/regions in which Cherry blossom is in season between March and April. The intelligent travel planning system 130 displays candidate locations as selected above by marking in a map, with any known user preference previously learned by the intelligent travel planning system 130 from the user 110 or from a large scale data on users who traveled to Japan for Cherry Blossom. The intelligent travel planning system 130 also explains the map as displayed by, "Highlights are the candidates for Cherry Blossom in March and April. Do you see ones you like or need more information?" The map presented during the travel planning session is similar to the high-level view map 410, having highlights in candidate locations 415.

The user 110 further asks by, "Hmm . . . Let's see. Can you tell me more about Tokyo?" The user 110 also may respond by clicking on or hovering over the displayed map to browse information as displayed by the intelligent travel planning system 130. The intelligent travel planning system 130 provides detailed information about Tokyo in the context of Cherry Blossom according to the request by the user 110 by: "There are many famous Cherry blossom viewing spots and activities in Tokyo including Ueno Park, Chidorigafuchi, hanami (picnic) party, boat rides, thousand cherry trees lit up in the evenings."

The user 110 may respond by "Sounds good. I'm sold", or continues to select candidate locations 415 from the map. The user 110 may complete the travel planning session and proceed with booking by use of the map with the candidate locations. The user 110 may save and exit the travel planning session to continue planning the same travel later. The intelligent travel planning system 130 provides interactive usage guide for the user 110 as to how to use the intelligent travel planning system 130.

In the travel planning session, the user 110 selects to travel Tokyo, Kyoto, and perhaps Nagoya, by train, and continues by asking "Nagasaki sounds good too. Is it doable?" The intelligent travel planning system 130 looks into current selections and responds by, "Since you have only 1 week and prefer a train ride, Nagasaki will be too far and not recommended for this trip unless you extend your stay or fly or modify existing selections!" The intelligent travel planning system 130 keeps a record that the user 110 is interested in visiting Nagasaki such that the user 110 may be reminded of the option in future planning sessions.

The user 110 agrees not to visit Nagasaki on this trip, and continues by ""I'm also interested in Snow walls, can you tell me about it? My sister also wants to go to Mt Fuji." The intelligent travel planning system 130 responds by "The famous "Snow Walls" are formed by expelling the heavy snow in Murodo-daira of Tateyama . . . it reaches about seven meters (23 ft) on average . . . open April 16$^{th}$.", and continues "But you already have another trip planned for April 13$^{th}$-April 15$^{th}$", as the intelligent travel planning system 130 checks out purchase history of the user 110 and finds an overlap. The intelligent travel planning system 130 further informs "Mt. Fuji opens year round but Cherry Blossom season here begins in mid-April", or provides information on alternative locations in southern region having characteristics similar to Mt. Fuji such that the user 110 may further explore the options to make an informed decision.

At the conclusion of the travel planning session, the user 110 agrees not to add Snow Walls to the agenda, but nevertheless adds Mt. Fuji during her trip, and wishes to extend the trip up to ten (10) days. The intelligent travel planning system 130 keeps a record that the user 110 is interested in sightseeing Snow Walls such that the user 110 may be reminded of the option in future planning sessions.

In the same embodiment, the intelligent travel planning system 130 further makes recommendations based on a departure airport, an arrival airport, travel dates, local transportation options, business hours of respective attractions, hotel availability in respective areas, user profile including physical conditions and preferences, memberships, reviews and ratings of candidate options, historical data of other travelers for the candidate options, special events during the travel period, and combinations thereof. The intelligent travel planning system 130 builds and displays the exemplary itinerary 400 including the high-level view map 410 and the detailed view table 420 to the user 110. The high-level view map 410 includes, regions, cities, days, etc., respectively linked to relevant item in the detailed view table 420, and vice versa. Activities, names of airports, hotels, tourist destinations, etc., in the detailed view table 420 are linked to further information such as respective home pages, review pages, etc. The user 110 may provide feedback to the exemplary itinerary 400 by drag and drop, reorder and/or move activities, dates, etc., from the detailed view table 420, or otherwise requests adjustment to the itinerary. A camera icon 430, representing images relevant to the site of the day, may be added to any day during the trip such that the user 110 may upload/download images from numerous image sharing/social media sites on the Internet. A memo pad icon 440, representing notes of the user 110, may also be added to any day during the trip such that the user 110 may create a personalized travel log, add files, notes, links, activities, reminders, etc. Once the user 110 decides on the itinerary as customized and adjusted, the intelligent travel planning system 130 makes reservation with respective travel booking systems and keeps a coordinated record based on the itinerary of the user 110.

Certain embodiments of the present invention may offer various technical computing advantages, including fully automating, customizing and following up a travel planning process for a coordinated and personalized itinerary. Automating personalized travel planning is critical as travel options to choose from have increased significantly according to the latest rapid evolution of telecommunication and e-commerce technologies, and consequently finding a best possible travel option by manually investigating all applicable travel options becomes unachievable. Due to the vast number of travel options available, travelers often miss out the most preferable options simply because such travel options had not been informed to the travelers at the time of planning Certain embodiments of the present invention performs automatic searches based on various factors that would ensure informed decision can be made by the travelers, makes recommendations to the travelers based on the searches, and produces itineraries by communicating with legacy travel booking systems.

Also as most travelers carry personal mobile telecommunication devices such as smartphones while traveling, follow-up services during the trips informing the travelers about changes and other local information that may affect the trips would dramatically increase convenience and safety of the travelers.

Certain embodiments of the present invention implement off-line update of the itineraries that may be later synchronized with the itineraries stored in the intelligent travel planning system and update the actual itinerary, improving efficiency in the automated adjusting of the itinerary and convenience of the travelers in updating the itinerary on the fly, without being limited by communication capability of the user device at the time of the updates.

Figure 5:
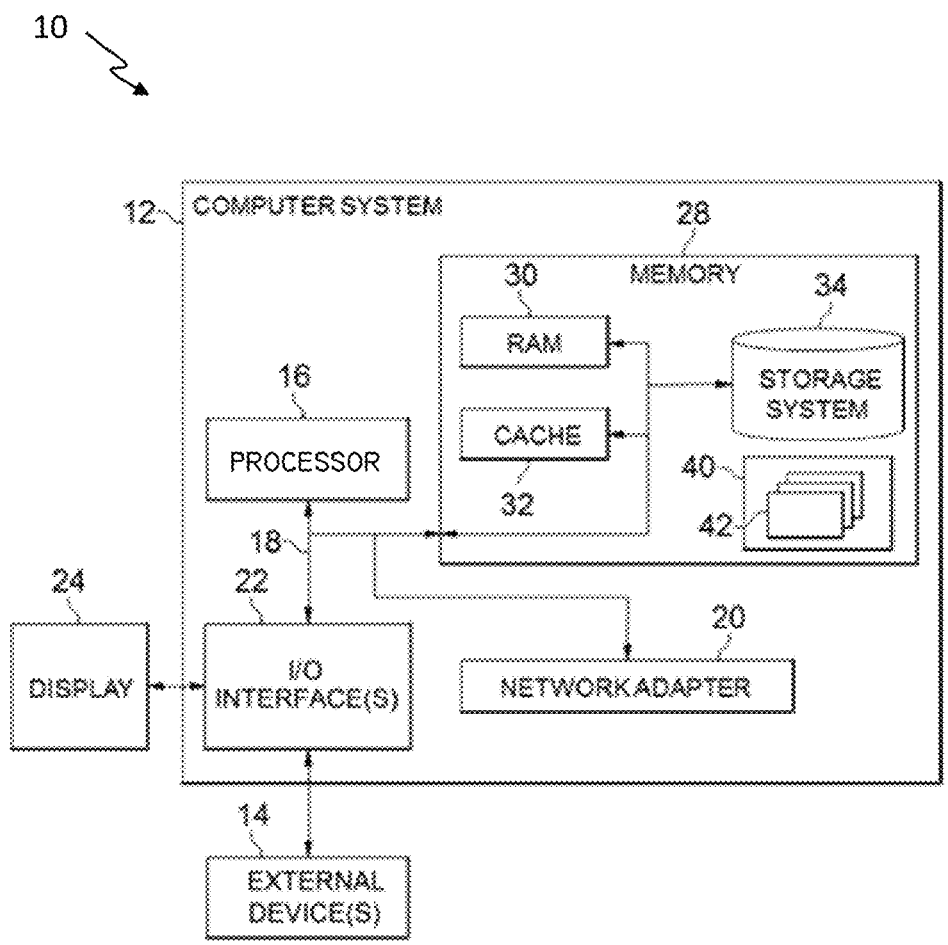
FIG. 5 depicts a cloud computing node according to an embodiment of the present invention.
Figure 6:
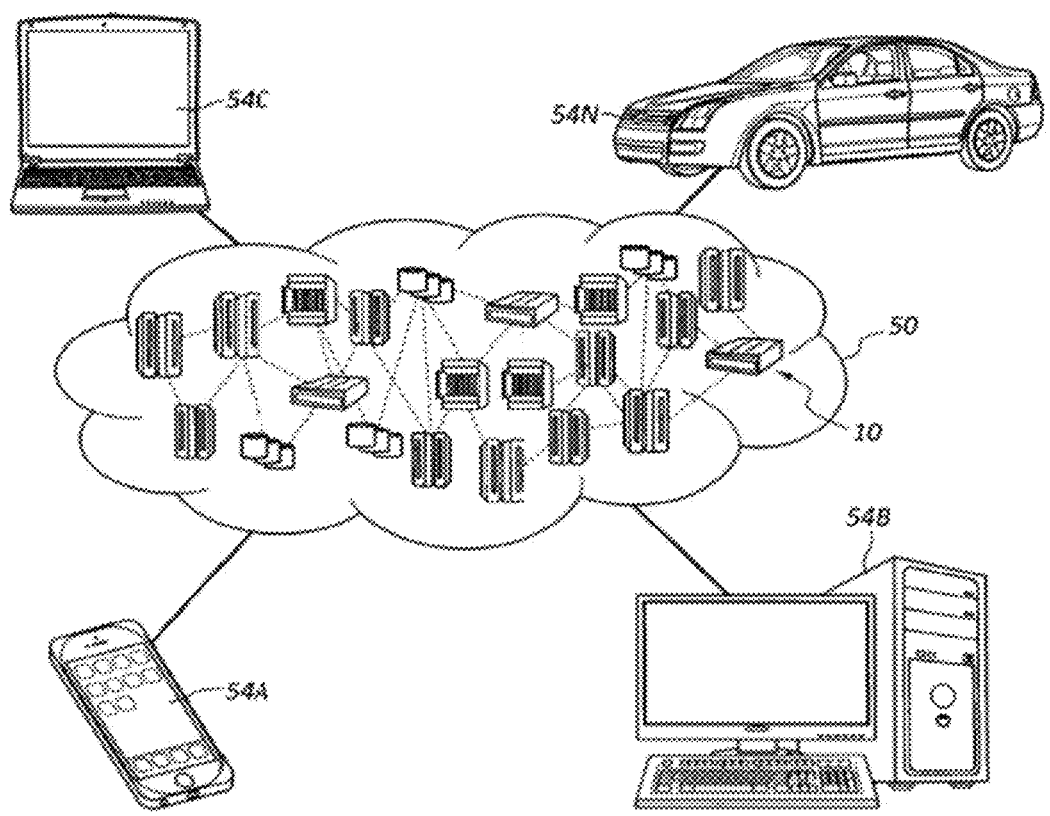
FIG. 6 depicts a cloud computing environment according to an embodiment of the present invention.
Figure 7:
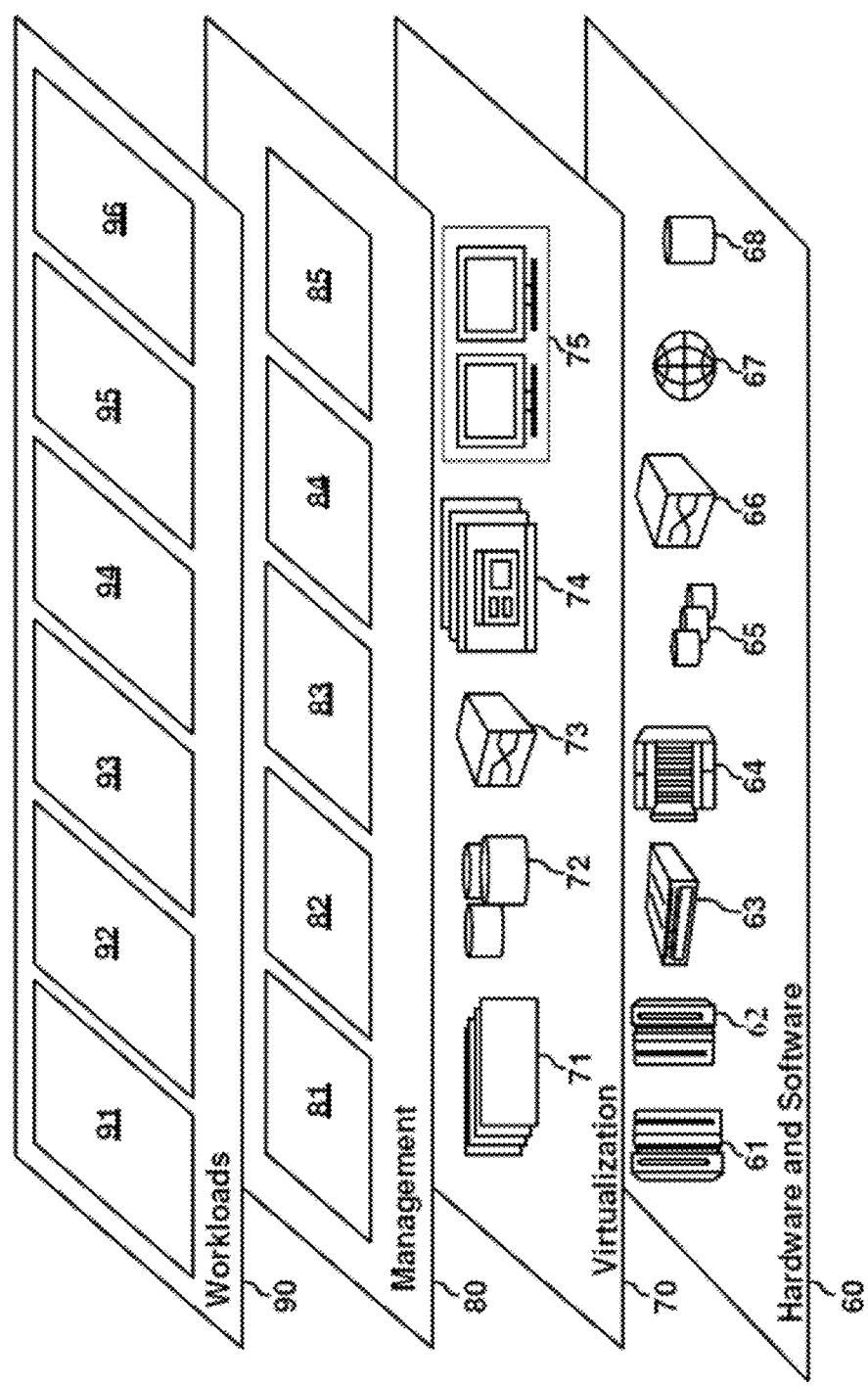
FIG. 7 depicts abstraction model layers according to an embodiment of the present invention.

FIGS. 5-7 depict various aspects of computing, including a computer system and cloud computing, in accordance with one or more aspects set forth herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail) The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 5, a schematic of an example of a computer system/cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program processes, being executed by a computer system. Generally, program processes may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

As shown in FIG. 5, computer system 12 in cloud computing node 10 is shown in the form of a general-purpose computing device. The components of computer system 12 may include, but are not limited to, one or more processors 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program processes that are configured to carry out the functions of embodiments of the invention.

One or more program 40, having a set (at least one) of program processes 42, may be stored in memory 28 by way of example, and not limitation, as well as an operating system, one or more application programs, other program processes, and program data. Each of the operating system, one or more application programs, other program processes, and program data or some combination thereof, may include an implementation of the web user interface 121 and the intelligent travel planning system 130 of FIG. 1. Program processes 42, as in the cognitive process 131, the history tracker 133, the user profiler 135, the itinerary builder 137, the scoring process 139, and the external source coordinator 141 of FIG. 1, generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Referring now to FIG. 6, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing components for an intelligent travel planning system, a cognitive process having a natural language processing functionality, a real time data coordination 96, as described herein. The processing components 96 can be understood as one or more program 40 described in FIG. 5.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A computer implemented method comprising:
receiving, by at least one processor, requirements for a trip from a user using a user interface;
collecting, by the at least one processor, preference information of the user for the trip;
searching, by the at least one processor, available travel options based on the requirements and the preference information;
building, by the at least one processor, an itinerary based on the travel options from the searching by use of a balance combination of relative weights for the preference information;
applying, by the at least one processor, external data relevant to the itinerary;
obtaining, by the at least one processor, a response to the itinerary from the user; and
making, by the at least one processor, reservations respective to the travel options in the itinerary, responsive to receiving a purchase confirmation of the itinerary from the user, wherein the method includes recording at least one change to the itinerary via the user interface in a user device while the user device is off-line, and responsive to the user device getting on-line, synchronizing the at least one change to the itinerary stored in a travel planning system and informing the user when a change of the at least one change conflicts with the itinerary or is otherwise unavailable, wherein the at least one processor runs the travel planning system, wherein the obtaining a response to the itinerary from the user includes obtaining from the user a feedback to adjust the itinerary, and wherein updating the balance combination is performed in response to a determining that a data source relative weight is less than a cap.

2. The computer implemented method of claim 1, wherein the balance combination includes a relative weight for a default preference and the data source relative weight, the data source relative weight associated to a data source, wherein the method includes updating the balance combination, wherein the updating the balance combination includes increasing the data source relative weight and decreasing the default relative weight, wherein the method includes iterating the searching, the building, the applying, and the obtaining by use of the updated balance combination.

3. The computer implemented method of claim 1, wherein the balance combination includes a relative weight for a default preference and the data source relative weight, the data source relative weight associated to a data source, wherein the method includes updating the balance combination, wherein the obtaining a response to the itinerary from the user includes obtaining from the user a feedback to adjust the itinerary.

4. The computer implemented method of claim 1, wherein the obtaining a response to the itinerary from the user includes obtaining from the user a feedback to adjust the itinerary.

5. The computer implemented method of claim 1, wherein a source of the preference information is selected from the group consisting of session data, a user profile, and a purchase history, respectively corresponding to the user, wherein the balance combination comprises a default relative weight and wherein the data source relative weight is selected from the group consisting of a session data relative weight for the session data, a user profile relative weight for the user profile, and a purchase history relative weight for the purchase history.

6. The computer implemented method of claim 1, wherein a source of the preference information is selected from the group consisting of session data, a user profile, and a purchase history, respectively corresponding to the user, wherein the balance combination comprises a default relative weight and wherein the data source relative weight is selected from the group consisting of a session data relative weight for the session data, a user profile relative weight for the user profile, and a purchase history relative weight for the purchase history, wherein the data source relative weight is a session data relative weight, the method further comprising: determining that the obtained response is a feedback to adjust the itinerary and that the session data relative weight for the session data is less than a predefined cap for the session data; updating the balance combination by increasing the session data relative weight for the session data by a predefined value and by decreasing the default relative weight for the default preference by the predefined value; and iterating the searching, the building, the applying, and the obtaining by use of the updated balance combination.

7. The computer implemented method of claim 1, wherein a source of the preference information is selected from the group consisting of session data, a user profile, and a purchase history, respectively corresponding to the user, wherein the balance combination comprises the a default relative weight and wherein the data source relative weight is selected from the group consisting of a session data relative weight for the session data, a user profile relative weight for the user profile, and a purchase history relative weight for the purchase history, wherein the data source relative weight is a user profile relative weight, wherein the building comprising: updating, responsive to determining that the user has the user profile and that the third user profile relative weight for the user profile is less than a predefined cap for the user profile, the balance combination by increasing the user profile relative weight for the user profile by the predefined value and by decreasing the default relative weight for the default preference by the predefined value; scoring the travel options by use of the updated balance combination; and creating the itinerary as a group of travel options scored greater than other options.

8. The computer implemented method of claim 1, wherein a source of the preference information is selected from the group consisting of session data, a user profile, and a purchase history, respectively corresponding to the user, wherein the balance combination comprises a default relative weight and wherein the data source relative weight is selected from the group consisting of a session data relative weight for the session data, a user profile relative weight for the user profile, and a purchase history relative weight for the purchase history, wherein the data source relative weight is a purchase history weight, the building comprising: updating, responsive to determining that the user has the purchase history and that the purchase history relative weight for the purchase history is less than a predefined cap for the purchase history, the balance combination by increasing the purchase history relative weight for the purchase history by the predefined value and by decreasing the default relative weight for the default preference by the predefined value; scoring the travel options by use of the updated balance combination; and creating the itinerary as a group of travel options scored greater than other options.

9. The computer implemented method of claim 1, wherein the method includes recording at least one change to the itinerary via the user interface in a user device, the method further comprising: responsive to the user device getting on-line performing correcting a reservation of the itinerary according to a change of the at least one change, and presenting new recommendations to the user.

10. The computer implemented method of claim 1, wherein the method includes recording at least one change to the itinerary via the user interface in a user device, the method further comprising: responsive to the user device getting on-line performing correcting a reservation of the itinerary according to a change of the at least one change, and presenting new recommendations to the user, and further comprising: gathering real time information from at least one external data source during the trip as stored in the itinerary, wherein the real time information is selected from the group consisting of: local news, local weather, local events, local traffic information, local road closure; and notifying the real time information to the user responsive to determining that the real time information is relevant to the trip as stored in the itinerary.

11. The method of claim 1, wherein the sources of the preference information comprises session data, a user profile, and a purchase history, respectively corresponding to the user, wherein the balance combination comprises a first relative weight for a default preference for all users, a second relative weight for the session data, a third relative weight for the user profile, and a fourth relative weight for the purchase history, wherein the user profile records demographic data of the user, wherein the session data includes feedback data of the user in response to a proposed one or more itinerary presented to the user during a current travel planning session, and wherein the purchase history includes data of prior purchases of travel itineraries by the user, wherein the fourth relative weight for the purchase history is in dependence on a number of historical itinerary purchases by the user.

12. The method of claim 1, wherein sources of the preference information comprises session data, a user profile, and a purchase history, respectively corresponding to the user, wherein the balance combination comprises a first relative weight for a default preference for all users, a second relative weight for the session data, a third relative weight for the user profile, and a fourth relative weight for the purchase history, wherein the user profile records demographic data of the user, wherein the session data includes feedback data of the user in response to a proposed one or more itinerary presented to the user during a current travel planning session, and wherein the purchase history includes data of prior purchases of travel itineraries by the user, wherein the fourth relative weight for the purchase history is in dependence on a number of historical itinerary purchases by the user, and wherein the method includes increasing the second relative weight from a first value to a second value in response receipt of first feedback data from the user during the current travel planning session, and wherein the method includes increasing the second relative weight from the second value to a third value in response receipt of second feedback data from the user during the current travel planning session, wherein the method includes recording at least one change to the itinerary via the user interface in a user device while the user device is off-line.

13. The computer implemented method of claim 1, wherein the sources of the preference information comprises session data, a user profile, and a purchase history, respectively corresponding to the user, wherein the balance combination comprises a first relative weight for a default preference for all users, a second relative weight for the session data, a third relative weight for the user profile, and a fourth relative weight for the purchase history, wherein the user profile records demographic data of the user, wherein the session data includes feedback data of the user in response to a proposed one or more itinerary presented to the user during a current travel planning session, and wherein the purchase history includes data of prior purchases of travel itineraries by the user, wherein the fourth relative weight for the purchase history is in dependence on a number of historical itinerary purchases by the user.

14. The computer implemented method of claim 1, wherein the sources of the preference information comprises session data, a user profile, and a purchase history, respectively corresponding to the user, wherein the balance combination comprises a first relative weight for a default preference for all users, a second relative weight for the session data, a third relative weight for the user profile, and a fourth relative weight for the purchase history, wherein the user profile records demographic data of the user, wherein the session data includes feedback data of the user in response to a proposed one or more itinerary presented to the user during a current travel planning session.

15. The computer implemented method of claim 1, wherein the balance combination includes a relative weight for a default preference and the data source relative weight, the data source relative weight associated to a data source and including session data, wherein the balance combination comprises a first relative weight for a default preference for all users, and a second relative weight for the session data, wherein the session data includes feedback data of the user in response to a proposed one or more itinerary presented to the user during a current travel planning session, wherein the method includes updating the balance combination, wherein the updating the balance combination includes increasing the data source relative weight by a certain value and decreasing the default relative weight to a nonzero weight in dependence on the certain value.

16. The computer implemented method of claim 1, wherein the balance combination includes a relative weight for a default preference and the data source relative weight, the data source relative weight associated to a data source.

17. A computer program product comprising:
a computer readable storage medium readable by one or more processing circuit and storing instructions for execution by one or more processor for performing a method comprising:
receiving, by at least one processor, requirements for a trip from a user using a user interface;
collecting, by the at least one processor, preference information of the user for the trip;
searching, by the at least one processor, available travel options based on the requirements and the preference information;
building, by the at least one processor, an itinerary based on the travel options from the searching by use of a balance combination of relative weights for the preference information;
applying, by the at least one processor, external data relevant to the itinerary;
obtaining, by the at least one processor, a response to the itinerary from the user; and
making, by the at least one processor, reservations respective to the travel options in the itinerary, responsive to receiving a purchase confirmation of the itinerary from the user, wherein the method includes recording at least one change to the itinerary via the user interface in a user device while the user device is off-line, and responsive to the user device getting on-line, synchronizing the at least one change to the itinerary stored in a travel planning system and informing the user when a change of the at least one change conflicts with the itinerary or is otherwise unavailable, wherein the at least one processor runs the travel planning system, wherein the obtaining a response to the itinerary from the user includes obtaining from the user a feedback to adjust the itinerary, and wherein updating the balance combination is performed in response to a determining that a data source relative weight is less than a cap.

18. The computer program product of claim 17, wherein the balance combination includes a relative weight for a default preference and the data source relative weight, the data source relative weight associated to a data source.

19. A system comprising:
a memory;
one or more processor in communication with the memory; and
program instructions executable by the one or more processor via the memory to perform a method comprising:
receiving, by at least one processor, requirements for a trip from a user using a user interface;
collecting, by the at least one processor, preference information of the user for the trip;
searching, by the at least one processor, available travel options based on the requirements and the preference information;
building, by the at least one processor, an itinerary based on the travel options from the searching by use of a balance combination of relative weights for the preference information;
applying, by the at least one processor, external data relevant to the itinerary;
obtaining, by the at least one processor, a response to the itinerary from the user; and
making, by the at least one processor, reservations respective to the travel options in the itinerary, responsive to receiving a purchase confirmation of the itinerary from the user, wherein the method includes recording at least one change to the itinerary via the user interface in a user device while the user device is off-line, and responsive to the user device getting on-line, synchronizing the at least one change to the itinerary stored in a travel planning system and informing the user when a change of the at least one change conflicts with the itinerary or is otherwise unavailable, wherein the at least one processor runs the travel planning system, wherein the obtaining a response to the itinerary from the user includes obtaining from the user a feedback to adjust the itinerary, and wherein updating the balance combination is performed in response to a determining that a data source relative weight is less than a cap.

20. The system of claim 19, wherein the balance combination includes a relative weight for a default preference and the data source relative weight, the data source relative weight associated to a data source.

* * * * *